(12) United States Patent
Manke

(10) Patent No.: US 8,806,992 B2
(45) Date of Patent: Aug. 19, 2014

(54) LANDING GEAR AXLE NUT SAFETY SOCKET

(75) Inventor: Douglas Manke, Huntington Beach, CA (US)

(73) Assignee: United Airlines, Inc., Chicago, IL (US)

(*) Notice: Subject to any disclaimer, the term of this patent is extended or adjusted under 35 U.S.C. 154(b) by 199 days.

(21) Appl. No.: 13/191,241

(22) Filed: Jul. 26, 2011

(65) Prior Publication Data

US 2012/0167374 A1 Jul. 5, 2012

Related U.S. Application Data

(60) Provisional application No. 61/428,758, filed on Dec. 30, 2010.

(51) Int. Cl.
*B25B 23/14* (2006.01)
*B25B 23/00* (2006.01)
*B25B 21/00* (2006.01)

(52) U.S. Cl.
CPC ............ *B25B 23/14* (2013.01); *B25B 23/0064* (2013.01); *B25B 21/002* (2013.01)
USPC ................................. 81/429; 81/55

(58) Field of Classification Search
CPC  B25B 23/14; B25B 23/0064; B25B 23/1427; B25B 21/002

USPC ............................................. 81/429, 58.3, 55
See application file for complete search history.

(56) References Cited

U.S. PATENT DOCUMENTS

| | | | |
|---|---|---|---|
| 4,813,312 A | 3/1989 | Wilhelm | |
| 4,949,602 A | 8/1990 | Letts et al. | |
| 5,682,800 A | 11/1997 | Jore | |
| 7,188,549 B2 | 3/2007 | Ohtake et al. | |

*Primary Examiner* — Bryan R Muller
(74) *Attorney, Agent, or Firm* — Marshall, Gerstein & Borun LLP

(57) ABSTRACT

A socket and a method for tightening a nut on an axle are disclosed. The socket includes a socket body having a first end and a second end. The first end of the socket body has a rotatable gear hub. The second end is configured to accommodate the nut. The socket includes a socket body insert fixed substantially within the socket body. The socket also includes a trigger movable between a triggered position and a non-triggered position, wherein the trigger is configured to move to the triggered position when a distance between the axle and nut is different than a predetermined trigger distance. The socket further includes a reset pin operably connected to the trigger to reset the trigger to the non-triggered position when depressed. The socket also includes a reset spring positioned between the reset pin and the gear hub to bias the reset pin towards the second end.

25 Claims, 7 Drawing Sheets

LANDING GEAR AXLE NUT SAFETY SOCKET

CROSS REFERENCE TO RELATED APPLICATIONS

This application claims the benefit of pending U.S. Provisional Application No. 61/428,758, filed Dec. 30, 2010, the entirety of which is incorporated herein by reference.

BACKGROUND

The instant disclosure relates to landing gear of aircraft. More specifically, the disclosure relates to a unique socket wrench configuration for tightening an axle nut on the landing gear.

In aviation, the landing gear is a structure that supports an aircraft on the ground and allows it to taxi, take off, and land. An aircraft usually has several landing gear units including nose landing gear (NLG) and main landing gear (MLG). Most configurations typically include wheels equipped with shock absorbers, brakes and other suspension components. Because the landing gear is a highly critical component, it is very important to make sure that the landing gear works properly on every aircraft. Most commercial airlines spend millions of dollars annually to maintain the landing gear on their aircraft.

FIG. 1A is an example of a main landing gear 100 on a commercial aircraft. The main landing gear 100 typically includes four wheels 110 mounted on a main gear truck assembly 120.

FIG. 1B shows a detailed view of the main gear truck assembly 120. The main gear truck assembly 120 includes a plurality of axles 85. Each axle 85 typically has a sleeve 90 attached to it. Each sleeve 90 is connected with an axle 85 for mounting the wheels 110. To properly install the wheels 110 on the axles 85, a mechanic or other highly qualified ground crew personnel installs at least a spacer 60 and a washer 65 before tightening an axle nut 70 to secure the wheel 110. These important components ensure the proper alignment and rotation of the wheel 110 and prevent premature wear or friction, among other potential problems. If a mechanic forgets to install the spacer 60 or the washer 65, or both, the wheel 110 and landing gear axle 85 may fail to function properly, be damaged, or both.

Currently, it is fairly easy for a mechanic to accidentally leave out spacers 60 and/or washers 65 during wheel changes. These spacers 60 and washers 65 may periodically stick to the old wheel 110 as a result of grease or dirt buildup. When a new wheel 110 is installed without a washer 65 and/or spacer 60, the axle nut 70 may still be tightened. Because the spacer 60 and the washer 65 are located behind the wheel 110 or nut 70, a missing component may be difficult to detect visually or by feel. Damage that results from faulty installation may require costly repairs, which leads to aircraft downtime. Further, improper installation of these components may result in monetary and other fines from regulatory agencies such as the Federal Aviation Administration.

SUMMARY

A socket for tightening a nut on an axle is disclosed. The socket includes a socket body having a first end and a second end. The first end of the socket body has a rotatable gear hub, and the second end is configured to accommodate the nut. The socket includes a socket body insert fixed substantially within the socket body and has a gear sleeve positioned substantially therein. The socket also includes a trigger movable between a triggered position and a non-triggered position. The trigger is configured to move to the triggered position when a distance between the axle and the nut is different than a predetermined trigger distance. The socket includes a trigger spring located between the socket body insert and the trigger, so that the spring biases the trigger against the second end. The trigger is configured to bias the trigger spring towards the first end when in the triggered position and is configured to decrease bias on the trigger spring in a non-triggered position. The socket also includes a reset pin operably connected to the trigger to reset the trigger to the non-triggered position when depressed. The socket also includes a reset spring positioned between the reset pin and the gear hub to bias the reset pin towards the second end. The socket includes a carrier located between the gear sleeve/reset pin assembly and the trigger. The carrier retains a plurality of ball bearings movable between the trigger and the reset pin. The ball bearings are configured to lock the trigger when positioned in the trigger and to lock the reset pin when the ball bearings are positioned in the reset pin.

A method to use the above embodiment of the socket for tightening a nut on a landing gear of an aircraft includes providing a socket having a socket body having a first end and a second end. The first end of the socket body has a rotatable gear hub, and the second end is configured to accommodate the nut. The socket includes a socket body insert fixed substantially within the socket body and having a gear sleeve positioned substantially therein. The socket also includes a trigger movable between a triggered position and a non-triggered position. The trigger is configured to move to the triggered position when a distance between the axle and the nut is different than a predetermined trigger distance. The socket includes a trigger spring between the socket body insert and the trigger, the trigger spring biasing the trigger against the second end. The trigger is configured to bias the trigger spring towards the first end in the triggered position and is configured to decrease bias on the trigger spring in the non-triggered position. The socket also includes a reset pin operably connected to the trigger to reset the trigger from the triggered position to the non-triggered position when depressed. The socket includes a reset spring between the reset pin and the gear hub, the reset spring biasing the reset pin towards the second end. The socket also includes a carrier between the gear sleeve/reset pin assembly and the trigger. The carrier retains a plurality of ball bearings movable between the trigger and the reset pin. The ball bearings are configured to lock the trigger when positioned in the trigger and lock the reset pin when positioned in the reset pin. A user positions the nut in the first end of the socket body. The user tightens the nut by rotating the gear hub when the trigger is in the non-triggered position.

DETAILED DESCRIPTION OF THE DRAWINGS

A socket for installing a nut on an axel is provided. The socket is configured to prevent mounting of a wheel or other member on an axel when washers and/or spacers are missing. For example, the socket may be utilized to install a wheel on the landing gear of aircraft. The socket includes a mechanism that senses the linear distance between the outermost edge of the axle and the edge of the axle nut. The mechanism includes a socket body, a trigger bushing, a trigger spring, a reset pin, a reset spring, and a plurality of retaining clips and ball bearings. In a non-triggered condition of the socket, the socket turns with the gear hub and applies torque to the axle nut to tighten the nut. In a triggered condition, the socket does not apply torque to the axle nut, and the gear hub turns freely without turning the socket body. Depressing the reset pin returns the socket from the triggered condition to the non-triggered condition.

Figure 1A:
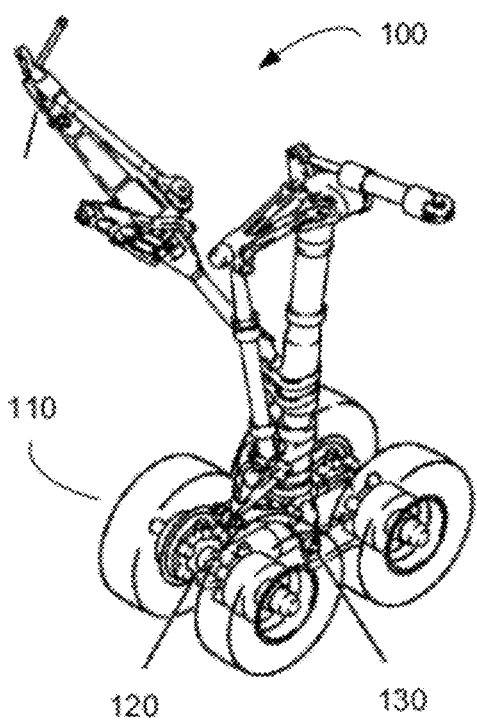
FIG. 1A is an example of a main landing gear on a commercial aircraft.
Figure 1B:
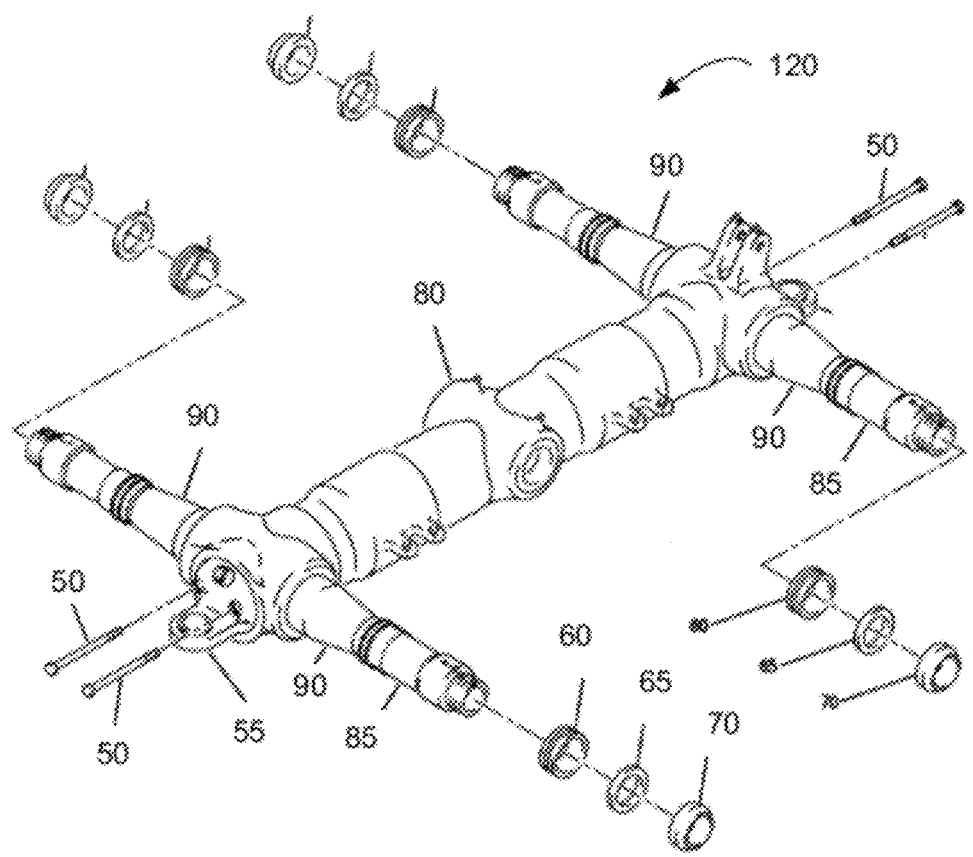
FIG. 1B is a detailed view of the main gear truck assembly in FIG. 1A.
Figure 2:
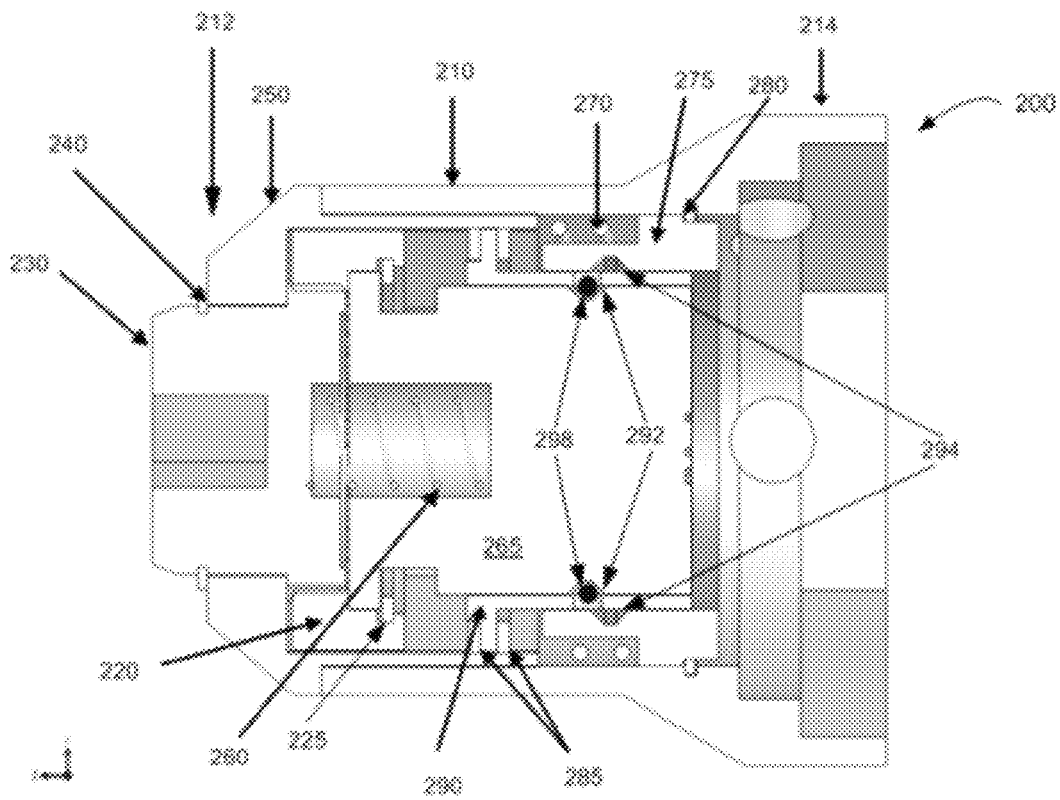
FIG. 2 is a cross-sectional view of a first embodiment of a socket in an un-triggered condition.

FIG. 2 is a cross-sectional view of a first embodiment of a socket 200 in a non-triggered condition. The socket 200 includes a socket body 210 configured to tighten the axle nut on the landing gear of the aircraft. The socket body 210 has a first end 212 and a second end 214. The first end 212 has a rotatable gear hub 230. The second end 214 is configured to accommodate the nut to be tightened. The socket body 210 may be welded to a socket body insert 250. The socket body 210 may be made of steel, aluminum, or any other suitable material for applying the desired torque to the nut. The socket body 210 and the socket body insert 250 may be made in one single piece or more pieces.

In the non-triggered condition, a gear sleeve 220 engages the gear hub 230. An outside surface of the gear sleeve 220 and an inside surface of the socket body insert 250 may be hexagonal in shape, for example. The gear sleeve 220 and the socket body insert 250 are configured to allow for linear travel between the two parts. The gear sleeve 220 does not rotate relative to the socket body insert 250. Thus, when the gear hub 230 is turned, the gear sleeve 220 turns with the gear hub 230. The gear sleeve 220 then turns the socket body insert 250 and thus the socket body 210 and the entire socket 200 to tighten the axle nut. A plurality of ball bearings 298 are retained by a carrier 290. The carrier 290 is held in place by carrier retaining clips 285 positioned in the socket body insert 250.

In the first embodiment, retaining clips are used to hold some of the different parts of the socket 200 together. For example, a trigger retaining clip 280 retains the trigger 275 within the socket body 210. The trigger retaining clip 280 fits into a machined groove in the socket body 210. Approximately half of the surface of the trigger retaining clip 280 fits into the groove, and the other half extends into the internal diameter of the socket body 210, for example. The trigger retaining clip 280 thus prevents the trigger 275 from moving out of the socket body 210 when the socket 200 is in the non-triggered mode. Retaining clips 240 retain the gear hub 230 in the socket body insert 250. Retaining clips 225 hold the gear sleeve 220 to a reset pin 265 that may be disposed in the center of the socket body 210.

A reset spring 260 is disposed between the reset pin 265 and the gear hub 230. In the un-triggered condition, the reset spring 260 biases the reset pin 265 towards the second end 214. Retaining clips 285 retain the carrier 290 to the socket body insert 250. Other retaining devices may be used to retain the different parts described above.

The socket system 200 may enter a triggered condition when a mechanic leaves out one or more interface components such as an axle nut washer and/or a wheel spacer during wheel changes. In this case, an outer edge of an axle pushes the trigger 275, and the trigger 275 is depressed against the trigger spring 270 when the socket system 200 is placed on the axle nut to be tightened. The movement of the trigger 275 against the trigger spring 270 is due to the additional distance between the outer most edge of the axle and the edge of the axle nut. Thus, the trigger 275 moves to a triggered position when the distance between the outermost edge of the axle and the edge of the axle nut is different than a predetermined trigger distance, such as the thickness of a typical washer, the length of a spacer, or other item used for installation of a wheel on an axel. When the trigger 275 moves the predetermined trigger distance, a trigger bearing groove 294 aligns with the ball bearings 298, and the ball bearings 298 move from a reset pin bearing groove 292 into the trigger bearing groove 294. The displaced ball bearings 298 lock the trigger 275 into a retracted position, as the reset pin 265 is unlocked and displaced by the reset spring 260. At the same time, the gear sleeve 220 is displaced the same distance as the reset pin 265, because the gear sleeve 220 is attached to the reset pin 265 via the retaining clips 225. The displaced gear sleeve 220 disengages the gear hub 230 to allow the gear hub 230 to spin freely without turning the axle nut, thus placing the socket 200 in the triggered condition.

Figure 3:
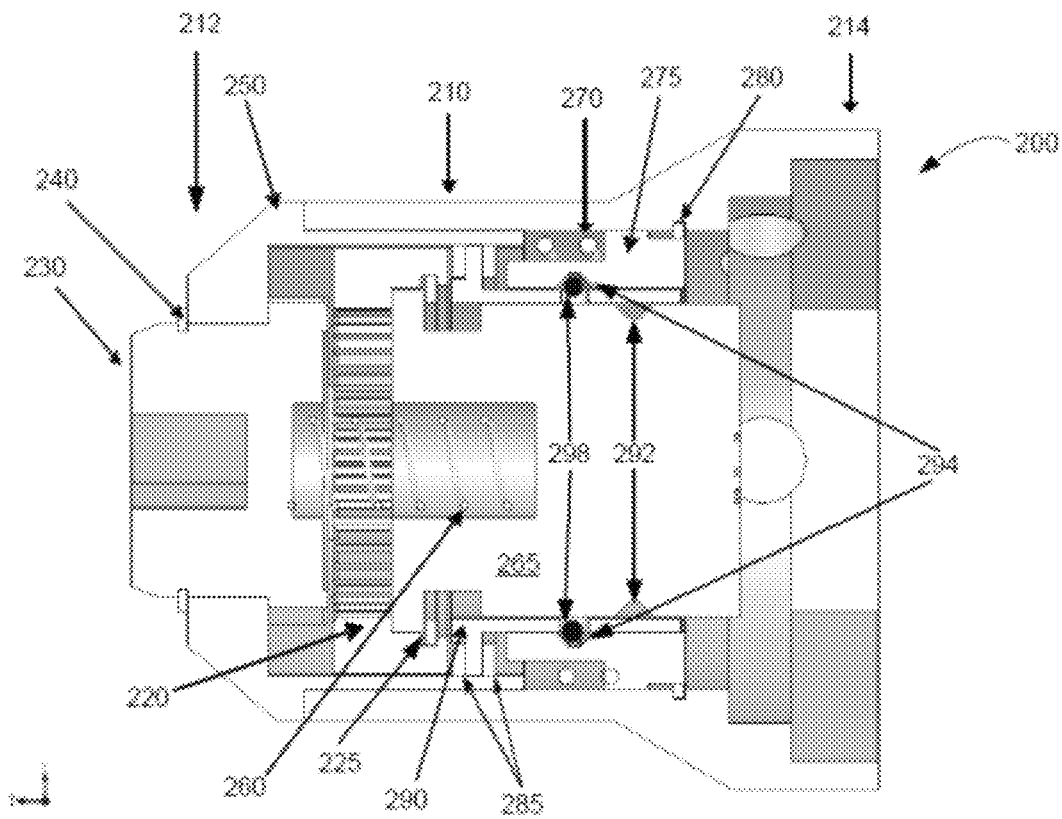
FIG. 3 is a cross-sectional view of the first embodiment of the socket shown in FIG. 2 in a triggered condition.

FIG. 3 is a cross-sectional view of the first embodiment of the socket 200 in a triggered condition. In the triggered condition, the gear hub 230 is not in contact with the gear sleeve 220, and the gear hub 230 turns freely without applying torque to the axle nut.

As soon as the socket moves into the triggered condition, the user will easily notice the fact that the wrench he or she is using is no longer capable of torquing/tightening the nut because the gear hub 230 is disengaged. At this point, the user may install the missing interface component or components. After the missed interface components are installed, the user may reset the socket 200 by depressing the reset pin 265 towards the gear hub 230. When the reset pin 265 is depressed against the reset spring 260 to the point where the reset pin groove 292 aligns with the ball bearings 298, the spring force from the trigger spring 270 displaces the ball bearings 298 from the trigger bearing groove 294 into the reset pin bearing groove 292. This allows the trigger spring 270 to move the trigger 275 to the non-triggered position.

With the interface component installed, the reset pin 265 is held in place by the ball bearings 298 in the carrier 290. The gear sleeve 220 then engages the gear hub 230. The engaged gear sleeve 220 and gear hub 230 allow the user to apply torque to tighten the axle nut.

Figure 4A:
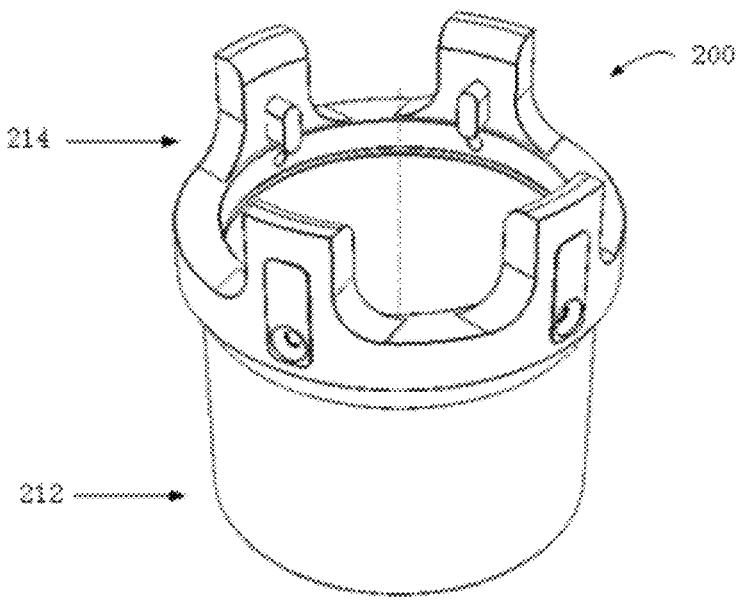
FIG. 4A is a perspective view of a second embodiment of a socket body.

FIG. 4A is a perspective view of a second socket embodiment 200. The second end 214 of the socket body is configured to accommodate the axle nut on the landing gear of the aircraft. In FIG. 4A, the first end 212 is under the second end 214 and includes the rotatable gear hub 230. Each aircraft series may have different styles of nuts on the main landing gear (MLG) and the nose landing gear (NLG). Thus, the socket 200 has a specially designed end for each style of nut.

Figure 4B:
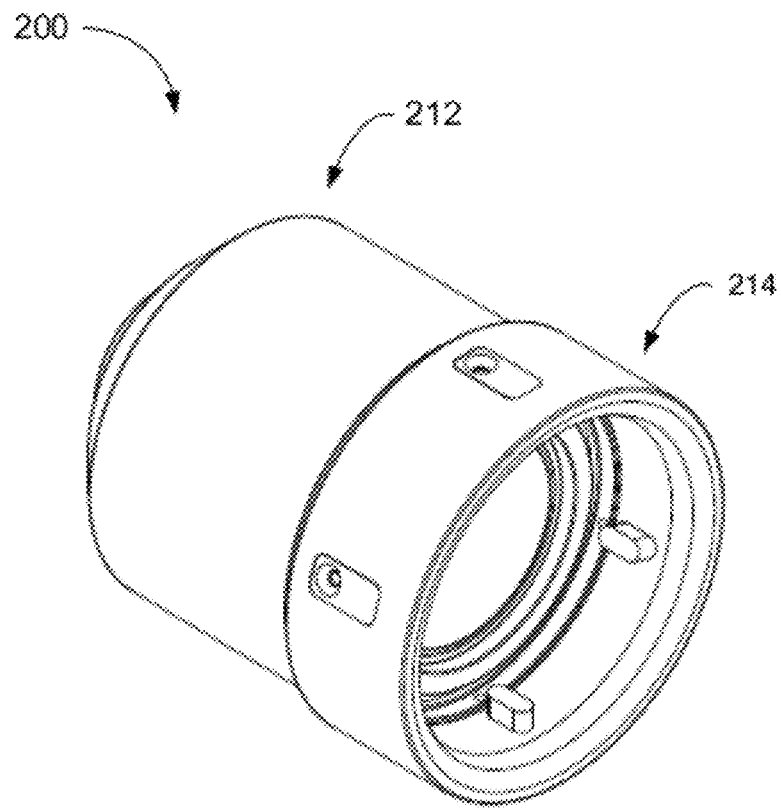
FIG. 4B is a perspective view of third embodiment of a socket body.

FIG. 4B illustrates a perspective view of a third socket embodiment 200 designed for nuts on the MLG. In the third embodiment, the second end 214 of the socket 200 is configured to accommodate nuts utilized on the MLG.

Figure 5:
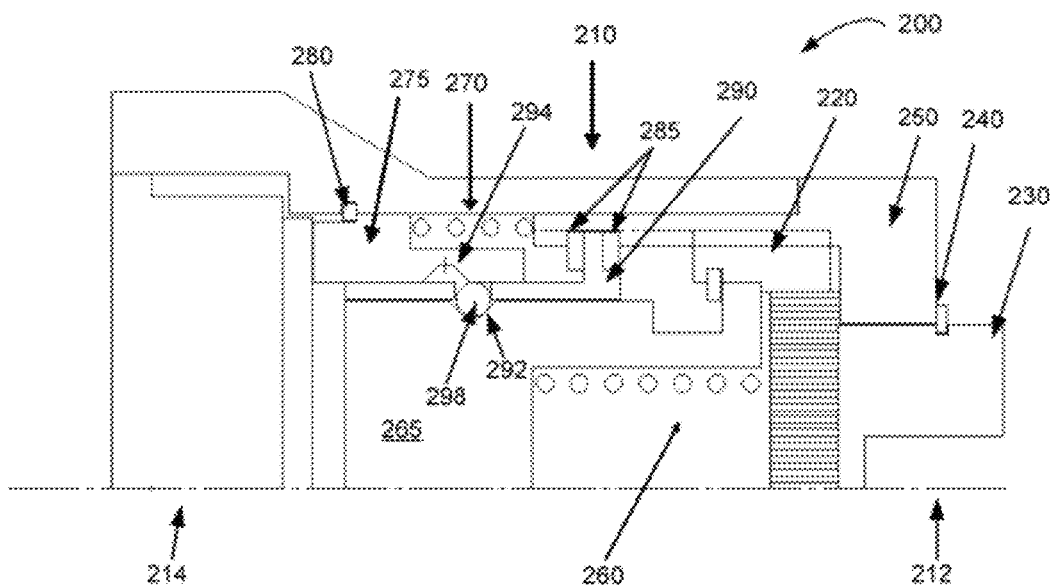
FIG. 5 is a cross-sectional view of the first embodiment of the socket.

FIG. 5 is a cross-sectional view of the first embodiment of the socket 200. The socket 200 may include the same components described above with reference to FIGS. 2-3. In this embodiment, the reset spring 260 and the trigger spring 270 may be made of similar or different materials that give the spring enough strength to push the ball bearings 298 from the trigger bearing groove 294 to the reset pin bearing groove 292 when the reset pin 265 or the trigger 275 is depressed.

Figure 6:
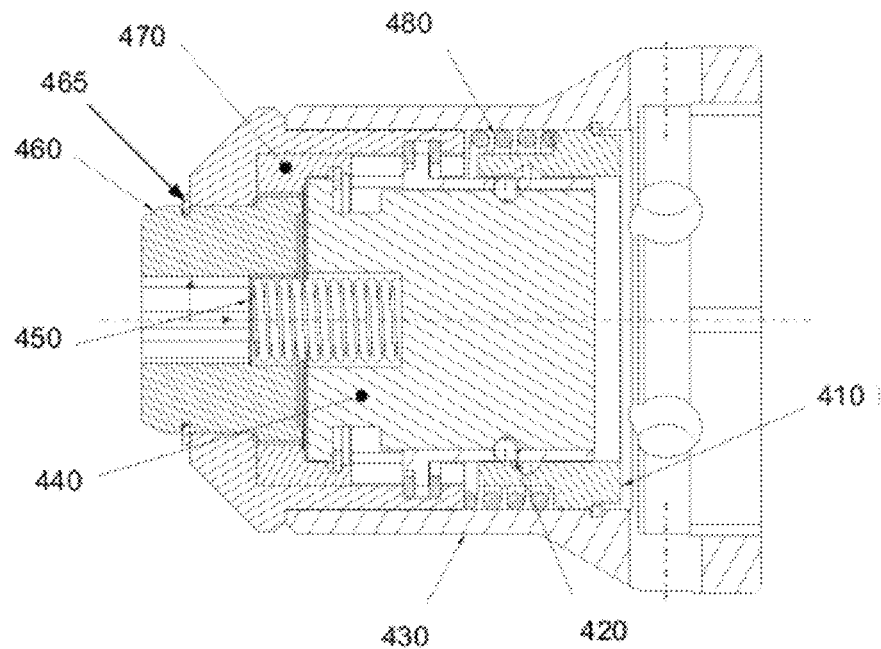
FIG. 6 is a shaded cross-sectional view of a fourth embodiment of the socket.

FIG. 6 is a shaded cross-sectional view of a fourth socket embodiment. In this embodiment, a trigger 410 is pushed inwardly by the additional axle length if a spacer or washer is not installed by a mechanic. When the trigger 410 moves a predetermined distance to the trigger point, a plurality of ball bearings 420 move from a groove in a reset pin 440 to a groove in the trigger 410, which releases the reset pin 440. A reset spring 450 pushes the reset pin 440 outwardly. Since the reset pin 440 is connected to a coupling sleeve 470 by a retainer ring 465, the reset pin 440 pulls the coupling sleeve 470 away from a gear hub 460 to disengage an internal mechanism between the coupling sleeve 470 and the gear hub 460.

To reset the internal mechanism, the user may push the reset pin 440 inwardly against the reset spring 450. At the same time, the trigger spring 480 pushes the trigger 410 back out and moves the ball bearings 420 back into the groove of the reset pin 440. A socket body 430 may be adapted to accommodate any size or shape of axle nut.

Figure 7:
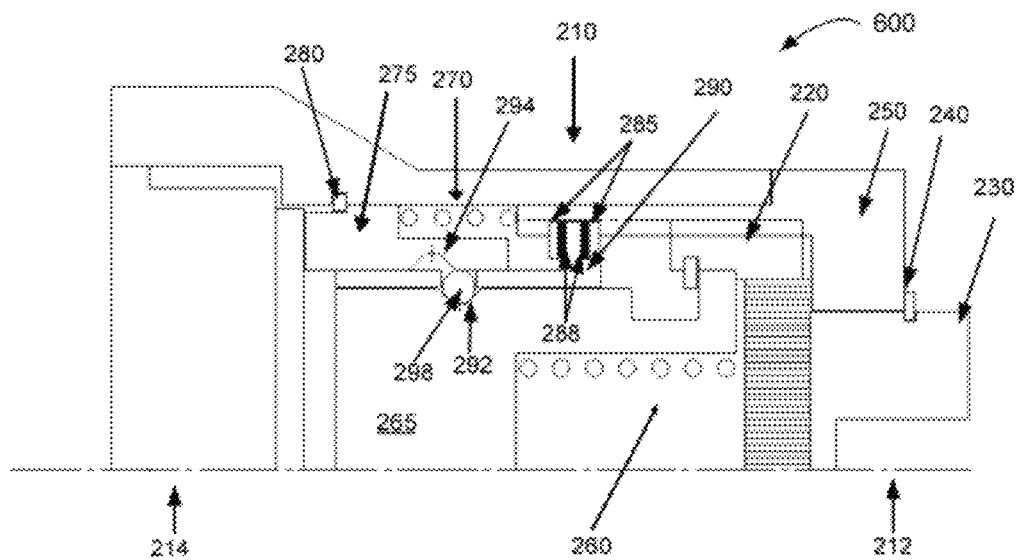
FIG. 7 is a cross-sectional view of a fifth embodiment of the socket.

FIG. 7 is a cross-sectional view of a fifth socket embodiment. The difference between this embodiment and the embodiment in FIG. 5 is the addition of calibration shims 288 between the carrier retaining clips 285. The calibration shims 288 allow for more accurate control over the trigger point due to accumulation of manufacturing tolerance during the initial build. In other words, the calibration shims 288 allow the socket manufacturer to calibrate the socket to the desired trigger distance. The calibration shims 288 may also be used to compensate for normal wear and tear when maintenance and/or recertification are required. The thickness of the shims 288 may be varied or adjusted to get the desired location and height of the carrier 290 or to get the desired trigger point. The shims 288 may be made of spring steel material or any other material with the desired flexibility and durability.

In the above embodiments, the trigger 275 and the reset pin 265 may be constructed of a Delrin material for its weight, wear, machineability, corrosion resistance and self-lubricating properties. However, any material may be used as long as the material has the desired properties. In one embodiment, the trigger 275 and the reset pin 265 are made from the plastic family. The carrier 290 may be made of 17-4PH stainless condition H900 for its strength and durability. The trigger spring 270 and the reset spring 260 may be made from a stainless material with high corrosion resistance. The trigger spring 270 may be made of any material to ensure even compression and may be made in the shape of large diameter and small height with flat section ends. Strong and corrosion resistant materials and coatings may also be used to maintain the accuracy of the different parts in the socket.

Figure 8:
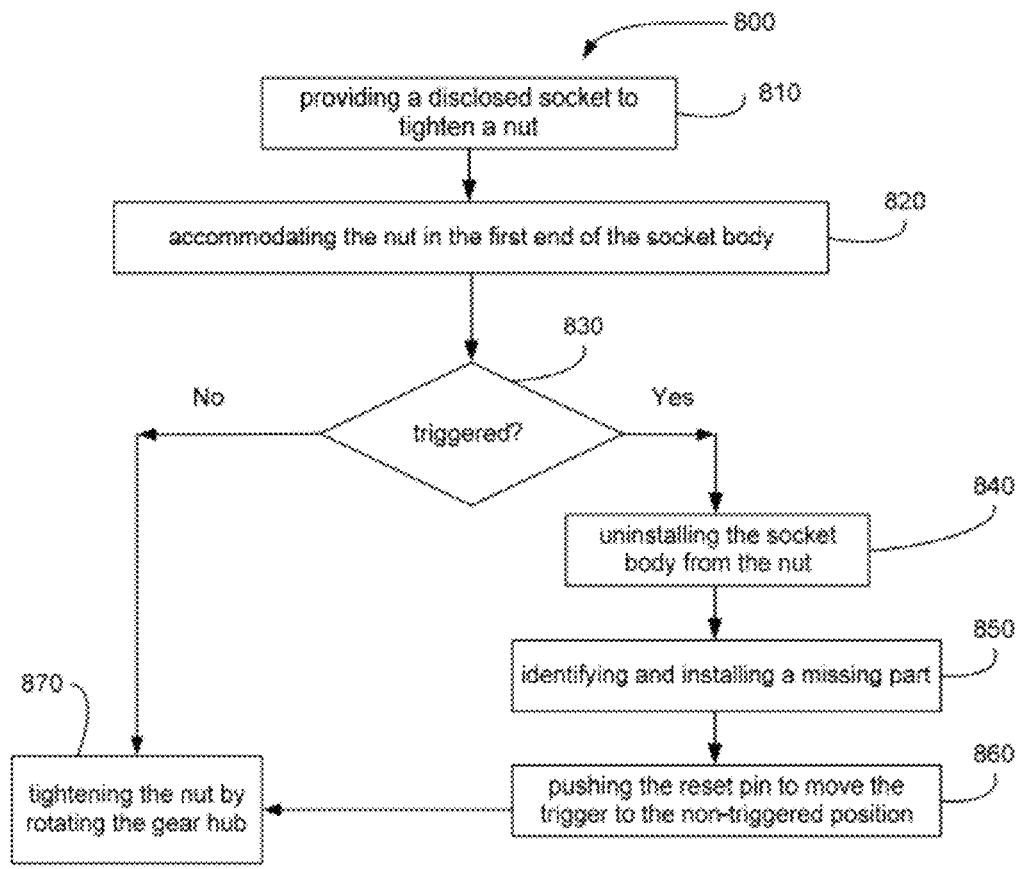
FIG. 8 is a flow chart that illustrates exemplary operations for using the socket in a first embodiment.

FIG. 8 is an exemplary flow chart that illustrates operations for using any of the socket embodiments described above. In act 810, the above-disclosed socket for tightening a nut is provided to a user. In act 820, the user positions the nut in the first end of the socket body. In act 830, the user determines if the trigger is triggered or not. When the trigger is in the non-triggered position, the user may tighten/torque the nut by rotating the gear hub in act 870. If the trigger is in the triggered position, the user may uninstall the socket from the nut in act 840. The user may identify and install the missing component such as, for example, an axle nut washer and/or wheel spacers in act 850. Once the missing component has been properly installed, the user may push the reset pin to move the trigger to the non-triggered position in act 860. With the socket in an un-triggered position, the user may tighten/torque the nut by rotating the gear hub in act 870.

Figure 9:
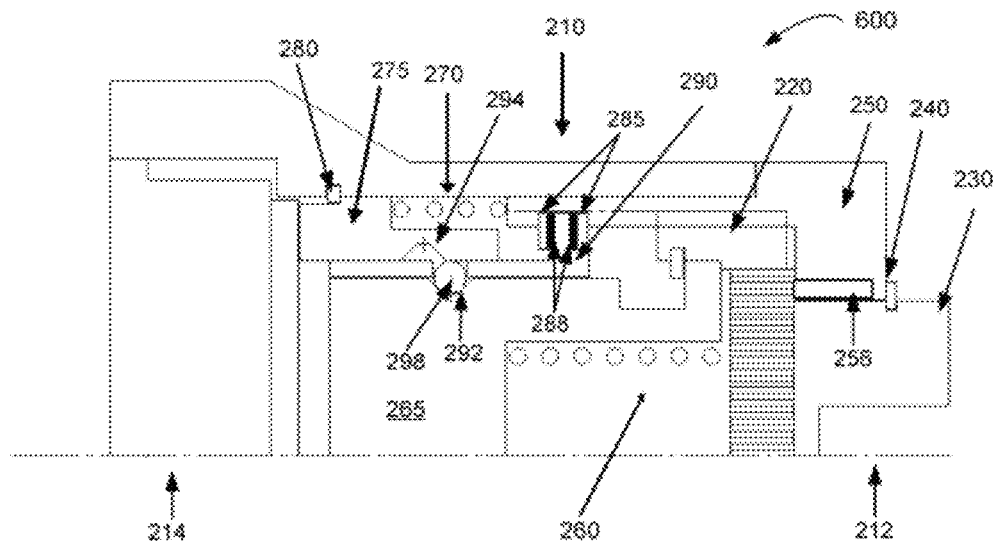
FIG. 9 is a cross-sectional view of a sixth embodiment of the socket with an additional clutch permits unidirectional rotation only.

FIG. 9 is a cross-sectional view of a sixth embodiment of the socket. The difference between this embodiment and the embodiment in FIG. 7 is the addition of a clutch 256 between the socket body 210 and gear hub 230. The clutch 256 permits unidirectional rotation only so that the socket 600 is always able to remove the axle nut whether the socket 600 is in triggered mode or not. Thus, the tightening of the nut assembly is the only action that is affected by the triggering of the socket. For example, the clutch 256 may be a sprag clutch, a roller clutch, an over-running clutch, a uni-directional clutch, or the like. With the added clutch 256, the socket 600 can thus remove the axle nut even when the socket 600 is in a triggered mode.

The instant disclosure discloses methods and embodiments of apparatus to prevent the tightening of axle nuts without required interface components. If the distance between the outermost edge of the axle and the outermost edge of the axle nut is different than a prescribed distance with the interface component properly installed, an internal mechanism of the socket will disengage the socket, preventing any torque from being applied to the axle nut. The internal mechanism between the gear sleeve and gear hub remains engaged constantly in the un-triggered condition. The mechanism will disengage when an interface component is missing while trying to torque the axle nut. Once the socket disengages, the user may easily depress the reset pin to reset and engage the internal mechanism. It should be understood that the current socket system may be adapted to tighten nuts on axles or other components to which a nut is tightened. The socket may be used on aircraft axles, car axles, or any vehicle axel.

It is therefore intended that the foregoing detailed description be regarded as illustrative rather than limiting, and that it be understood that it is the following claims, including all equivalents, that are intended to define the spirit and scope of this invention.

The invention claimed is:

1. A socket for tightening a nut on an axle, the socket comprising:
   a socket body having a first end and a second end, said first end of said socket body having a rotatable gear hub, and said second end configured to accommodate said nut;
   a socket body insert fixed substantially within said socket body and having a gear sleeve positioned substantially therein;
   a trigger movable between a triggered position and a non-triggered position, said trigger configured to move to said triggered position when a distance between said axle and said nut is different than a predetermined trigger distance;
   a trigger spring between said socket body insert and said trigger, said trigger spring biasing said trigger toward said second end, said trigger configured to compress said trigger spring towards said first end in said triggered position and configured to decrease compression on said trigger spring in said non-triggered position;

a reset pin operably connected to said trigger to reset said trigger from said triggered position to said non-triggered position when depressed toward said first end;

a reset spring between said reset pin and said gear hub, said reset spring biasing said reset pin towards said second end; and a carrier between said gear sleeve and said trigger, said carrier retaining a plurality of ball bearings movable between said trigger and said reset pin, said ball bearings configured to lock said trigger when positioned in said trigger and lock said reset pin when positioned in said reset pin.

2. The socket of claim 1,
wherein said trigger moves to said triggered position when said trigger is moved towards said trigger spring,
wherein when said trigger is in said triggered position, said gear sleeve disengages said gear hub, said gear hub turns freely, and
wherein when said trigger is in said non-triggered position, said gear sleeve engages said gear hub, said socket body turns with said gear hub and said gear sleeve.

3. The socket of claim 1, further comprising a trigger retainer that retains said trigger to said socket body.

4. The socket of claim 1, wherein said trigger has a trigger ball groove disposed on a surface of said trigger.

5. The socket of claim 4, wherein said reset pin has a reset pin ball groove disposed on a surface of said reset pin.

6. The socket of claim 5, wherein said ball bearings move from said reset pin bearing groove into said trigger bearing groove when said trigger moves to said triggered position.

7. The socket of claim 5, wherein said ball bearings move from said trigger bearing groove into said reset pin bearing groove when said trigger moves to said non-triggered position.

8. The socket of claim 1, wherein said trigger distance is adjustable.

9. The socket of claim 1, further comprising:
at least one first retaining ring configured to retain said gear sleeve to said reset pin;
at least one second retaining ring configured to retain said gear hub to said socket insert; and
a third plurality of retaining rings configured to retain said socket body insert to said carrier.

10. The socket of claim 9, further comprising a calibration shim between said third plurality of retaining rings.

11. The socket of claim 10, wherein said thickness of said calibration shim is adjusted to a shape of said carrier.

12. The socket of claim 10, wherein reset pin is disposed in said center of said socket body.

13. A method for tightening a nut on a landing gear of an aircraft, the method comprising:
providing a socket having (i) a socket body having a first end and a second end, said first end of said socket body having a rotatable gear hub, and said second end configured to accommodate said nut; (ii) socket body insert fixed substantially within said socket body and having a gear sleeve positioned substantially therein; (iii) a trigger movable between a triggered position and a non-triggered position, said trigger configured to move to said triggered position when a distance between said axle and said nut is different than a predetermined trigger distance; (iv) a trigger spring between said socket body insert and said trigger, said trigger spring biasing said trigger toward said second end, said trigger configured to compress said trigger spring towards said first end in said triggered position and configured to decrease compression on said trigger spring in said non-triggered position; (v) a reset pin operably connected to said trigger to reset said trigger from said triggered position to said non-triggered position when depressed toward said first end; (vi) a reset spring between said reset pin and said gear hub, said reset spring biasing said reset pin towards said second end; and (vii) a carrier between said gear sleeve and said trigger, said carrier retaining a plurality of ball bearings movable between said trigger and said reset pin, said ball bearings configured to lock said trigger when positioned in said trigger and lock said reset pin when positioned in said reset pin;

accommodating said nut in said first end of said socket body; and tightening said nut by rotating said gear hub when said trigger is in said non-triggered position.

14. The method for tightening a nut on a landing gear of an aircraft of claim 13, further comprising:
uninstalling said socket body from said nut when said trigger is in said triggered position.

15. The method for tightening a nut on a landing gear of an aircraft of claim 14, further comprising:
identifying and installing a missing part; and
depressing said reset pin to move said trigger to said non-triggered position.

16. The method for tightening a nut on a landing gear of an aircraft of claim 13,
wherein said trigger moves to said triggered position when said trigger is moved towards said trigger spring,
wherein when said trigger is in said triggered position, said gear sleeve disengages said gear hub, said gear hub turns freely, and
wherein when said trigger is in said non-triggered position, said gear sleeve engages said gear hub, said socket body turns with said gear hub and said gear sleeve.

17. The method for tightening a nut on a landing gear of an aircraft of claim 13, wherein said trigger has a trigger ball groove disposed on a surface of said trigger.

18. The method for tightening a nut on a landing gear of an aircraft of claim 13, wherein said reset pin has a reset pin ball groove disposed on a surface of said reset pin.

19. The method for tightening a nut on a landing gear of an aircraft of claim 18, wherein said ball bearings move from said reset pin bearing groove into said trigger bearing groove when said trigger moves to said triggered position.

20. The method for tightening a nut on a landing gear of an aircraft of claim 18, wherein said ball bearings move from said trigger bearing groove into said reset pin bearing groove when said trigger moves to said non-triggered position.

21. The method for tightening a nut on a landing gear of an aircraft of claim 13, wherein said trigger distance is adjustable.

22. The method for tightening a nut on a landing gear of an aircraft of claim 13, wherein said socket further comprising:
at least one first retaining ring configured to retain said gear sleeve to said reset pin;
at least one second retaining ring configured to retain said gear hub to said socket insert; and
a third plurality of retaining rings configured to retain said socket body insert to said carrier.

23. The method for tightening a nut on a landing gear of an aircraft of claim 13, wherein said socket further comprising a calibration shim between said third plurality of retaining rings.

24. The method for tightening a nut on a landing gear of an aircraft of claim 23, wherein said thickness of said calibration shim is adjusted to a shape of said carrier.

25. The socket of claim 1, further comprising a clutch between said socket body and said gear hub, said clutch permitting only uni-directional rotation.

\* \* \* \* \*